(12) United States Patent
Shibamoto (10) Patent No.: US 8,381,990 B2
(45) Date of Patent: Feb. 26, 2013

(54) ANTENNA MODULE

(75) Inventor: Goro Shibamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 12/058,366

(22) Filed: Mar. 28, 2008

(65) Prior Publication Data

US 2008/0237358 A1 Oct. 2, 2008

(30) Foreign Application Priority Data

Mar. 30, 2007 (JP) ................. P2007-094020

(51) Int. Cl.
*G06K 19/06* (2006.01)

(52) U.S. Cl. ........................ 235/492; 235/451

(58) Field of Classification Search .............. 235/375, 235/451, 487, 492, 380; 340/572.1; 343/700 R
See application file for complete search history.

(56) References Cited

U.S. PATENT DOCUMENTS

| | | | | |
|---|---|---|---|---|
| 5,528,458 | A * | 6/1996 | Yasuho et al. | 361/718 |
| 6,737,153 | B2 * | 5/2004 | Suzumura et al. | 428/209 |
| 6,820,314 | B2 * | 11/2004 | Ferguson et al. | 29/25.42 |
| 6,940,722 | B2 * | 9/2005 | Tetsuka et al. | 361/708 |
| 2003/0106204 | A1 * | 6/2003 | Ferguson et al. | 29/601 |
| 2003/0151898 | A1 * | 8/2003 | Tetsuka et al. | 361/705 |
| 2003/0158696 | A1 * | 8/2003 | Gold et al. | 702/132 |
| 2004/0156175 | A1 * | 8/2004 | Nakamura et al. | 361/720 |
| 2006/0214295 | A1 * | 9/2006 | Tanaka et al. | 257/747 |

FOREIGN PATENT DOCUMENTS

| | | |
|---|---|---|
| JP | 2000-163543 | 6/2000 |
| JP | 2003-98009 | 4/2003 |
| JP | 2005-311205 A | 11/2005 |
| JP | 2006-340085 A | 12/2006 |
| JP | 2007-58817 | 3/2007 |

OTHER PUBLICATIONS

Search Report dated Apr. 6, 2009, from Austrian Patent Office in corresponding Singapore Application No. 200802467-1 filed Mar. 28, 2008.
Office Action for corresponding Japanese Application No. 2008-092191 dated Aug. 23, 2012.
English-language Translation of JP 2005-311205 A.
English-language Translation of JP 2006-340085 A.

* cited by examiner

*Primary Examiner* — Tuyen K Vo
(74) *Attorney, Agent, or Firm* — Finnegan, Henderson, Farabow, Garrett & Dunner, L.L.P.

(57) ABSTRACT

An antenna module in which an antenna coil formed of a metal foil and a condenser are formed on an insulating substrate, the antenna module includes: a control circuit configured to control communications done by the antenna coil, the control circuit disposed on the insulating substrate; and a pattern formed of a metal foil, wherein the pattern is formed on the insulating substrate on the opposite side of the control circuit through the insulating substrate, and the control circuit has: a detecting means for detecting a temperature of the control circuit, and a control means for terminating the communications when a temperature of the control circuit is equal to or above a predetermined temperature.

6 Claims, 9 Drawing Sheets

| SHAPE AND SIZE | AREA RATIO | THICKNESS | WHETHER TO DETECT AN ABNORMAL TEMPERATURE BY THE TEMPERATURE SENSOR |
|---|---|---|---|
| FIG. 5 | 2 TIMES | 20μm | NOT DETECTED |
| FIG. 6 | SAME | 0μm | DETECTED (30 SECONDS) |

| SHAPE AND SIZE | AREA RATIO | THICKNESS | WHETHER TO DETECT AN ABNORMAL TEMPERATURE BY THE TEMPERATURE SENSOR | APPEARANCE |
|---|---|---|---|---|
| FIG. 5 | 2 TIMES | 10μm | NOT DETECTED | NO PROBLEM |
| FIG. 5 | 2 TIMES | 20μm | NOT DETECTED | NO PROBLEM |
| FIG. 5 | 2 TIMES | 40μm | NOT DETECTED | NO PROBLEM |
| FIG. 5 | 2 TIMES | 5μm | DETECTED (70 SECONDS) | NO PROBLEM |
| FIG. 5 | 2 TIMES | 50μm | NOT DETECTED | THE ANTENNA TENDS TO FLOAT |

FIG. 8

| SHAPE AND SIZE | AREA RATIO | THICKNESS | WHETHER TO DETECT AN ABNORMAL TEMPERATURE BY THE TEMPERATURE SENSOR | COMMUNICATIONS WITH THE READER/WRITER |
|---|---|---|---|---|
| FIG. 9 | 0.5 TIMES | 20μm | NOT DETECTED | NO PROBLEM |
| FIG. 5 | 2 TIMES | 20μm | NOT DETECTED | NO PROBLEM |
| FIG. 10 | 16 TIMES | 20μm | NOT DETECTED | NO PROBLEM |
| FIG. 11 | 0.2 TIMES | 20μm | DETECTED (60 SECONDS) | NO PROBLEM |
| FIG. 12 | 20 TIMES | 20μm | NOT DETECTED | COMMUNICATION ERROR WHEN OFFSET |

ANTENNA MODULE

CROSS REFERENCES TO RELATED APPLICATIONS

The present invention contains subject matter related to Japanese Patent Application JP 2007-094020 filed in the Japanese Patent Office on Mar. 30, 2007, the entire contents of which being incorporated herein by reference.

BACKGROUND OF THE INVENTION

1. Field of the Invention

The present invention relates to an antenna module, particularly to an antenna module which facilitates heat dissipation in the IC chip to suppress the termination of communications in the case in which communications are stopped depending on the temperature of an IC (Integrated Circuit) chip.

2. Description of the Related Art

In recent years, IC media are widely available including noncontact IC cards and RFID tags in the size other than the standardized card size using RFID (radio frequency identification) technique and contact IC cards. Particularly, because of the convenience of the noncontact IC cards and the RFID tags in which the card is just placed on a card reader or held thereto to exchange information, they are applied in various fields including transportation such as the ticket gates of railroads, primarily used in this field, security systems such as access management, and product management systems in factories.

A noncontact IC card is fabricated in which an antenna coil is formed on an insulating substrate, an IC chip is mounted on the substrate to configure an antenna module, and then the antenna module is sandwiched between a pair of card forming sheets of a synthetic resin. Therefore, the noncontact IC card has semiconductor properties such as a degradation in properties and a reduction in reliability due to a temperature rise.

In recent years, as part of countermeasures to protect security against a temperature rise, it is considered to prevent a temperature rise in the IC chip caused by communications.

For this method, such a method is invented in which in a noncontact IC card having an IC chip connected to an antenna coil by wire bonding packaging, a metal foil heat sink is formed between the IC chip and an insulating substrate mounting the chip thereon, whereby the heat dissipation properties of the IC chip are improved (for example, see Patent Reference 1 (JP-A-2000-163543)).

However, in the case in which an IC chip is connected to an antenna coil by flip chip packaging, the IC chip is directly connected to an insulating substrate with bumps. Thus, it is difficult to form a metal foil heat sink between the IC chip and the insulating substrate mounting the chip thereon. Therefore, in this case, it is hard to accelerate heat dissipation in the IC chip.

In addition, as part of countermeasures to protect security against a temperature rise, such a technique is also invented in which a temperature sensor is mounted in an IC chip of a noncontact IC card and communications through an antenna coil are terminated in the case in which the temperature sensor detects that the temperature of the IC chip reaches a predetermined temperature.

SUMMARY OF THE INVENTION

However, in this case, when the temperature of the IC chip rises due to communications, even though the IC chip is placed within the distance of allowing communications with a reader/writer, the IC chip might not communicate with it. Particularly, under high temperature environments, this occurs noticeably.

It is thus desirable to accelerate heat dissipation in an IC chip and to suppress the termination of communications in the case in which communications are stopped depending on the temperature of the IC chip.

An antenna module according to an embodiment of the invention is an antenna module in which an antenna coil formed of a metal foil and a condenser are formed on an insulating substrate, the antenna module including: a control circuit configured to control communications done by the antenna coil, the control circuit disposed on the insulating substrate; and a pattern formed of a metal foil, wherein the pattern is formed on the insulating substrate on the opposite side of the control circuit through the insulating substrate, and the control circuit has: a detecting means for detecting a temperature of the control circuit, and a control means for terminating the communications when a temperature of the control circuit is equal to or above a predetermined temperature.

In the antenna module according to the embodiment of the invention, a space on the insulating substrate on which the control circuit is disposed and a space on the insulating substrate on which the pattern is formed may be at least partially overlapped with each other through the insulating substrate.

In the antenna module according to the embodiment of the invention, an area of a space on the insulating substrate on which the pattern is formed may be between 0.5 times and 16 times, inclusive, an area of a space on the insulating substrate on which the control circuit is disposed.

In the antenna module according to the embodiment of the invention, a thickness of the pattern may be between 10 micrometers and 40 micrometers inclusive.

In the embodiment of the invention, the control circuit that controls communications done by the antenna coil formed of a metal foil on the insulating substrate is disposed on the insulating substrate, and the pattern formed of a metal foil is formed on the insulating substrate on the opposite side of the control circuit through the insulating substrate. In addition, the control circuit detects the temperature of the control circuit, and terminates the communications in the case in which the temperature of the control circuit is equal to or above a predetermined temperature.

As discussed above, according to the embodiment of the invention, heat dissipation is accelerated in an IC chip and the termination of communications is suppressed in the case in which communications are stopped depending on the temperature of the IC chip.

DETAILED DESCRIPTION OF THE INVENTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

An antenna module according to an embodiment of the invention is an antenna module (for example, an antenna module 11 shown in FIG. 1) in which an antenna coil (for example, an antenna coil 31 shown in FIG. 2) formed of a metal foil and a condenser (for example, a conductor 32A shown in FIG. 2 and a conductor 32B shown in FIG. 3) are formed on an insulating substrate (for example, an insulating substrate 21 shown in FIG. 1), the antenna module including: a control circuit (for example, an IC chip 22 shown in FIG. 1) configured to control communications done by the antenna coil, the control circuit disposed on the insulating substrate; and a pattern (for example, a pattern 33 shown in FIG. 3) formed of a metal foil, wherein the pattern is formed on the insulating substrate on the opposite side of the control circuit through the insulating substrate, and the control circuit has: a detecting means (for example, a temperature sensor 22A shown in FIG. 2) for detecting a temperature of the control circuit, and a control means (for example, a control circuit 22B shown in FIG. 2) for terminating the communications when a temperature of the control circuit is equal to or above a predetermined temperature.

Hereinafter, a specific implementation to which an embodiment of the invention is adapted will be described in detail with reference to the drawings.

Figure 1:
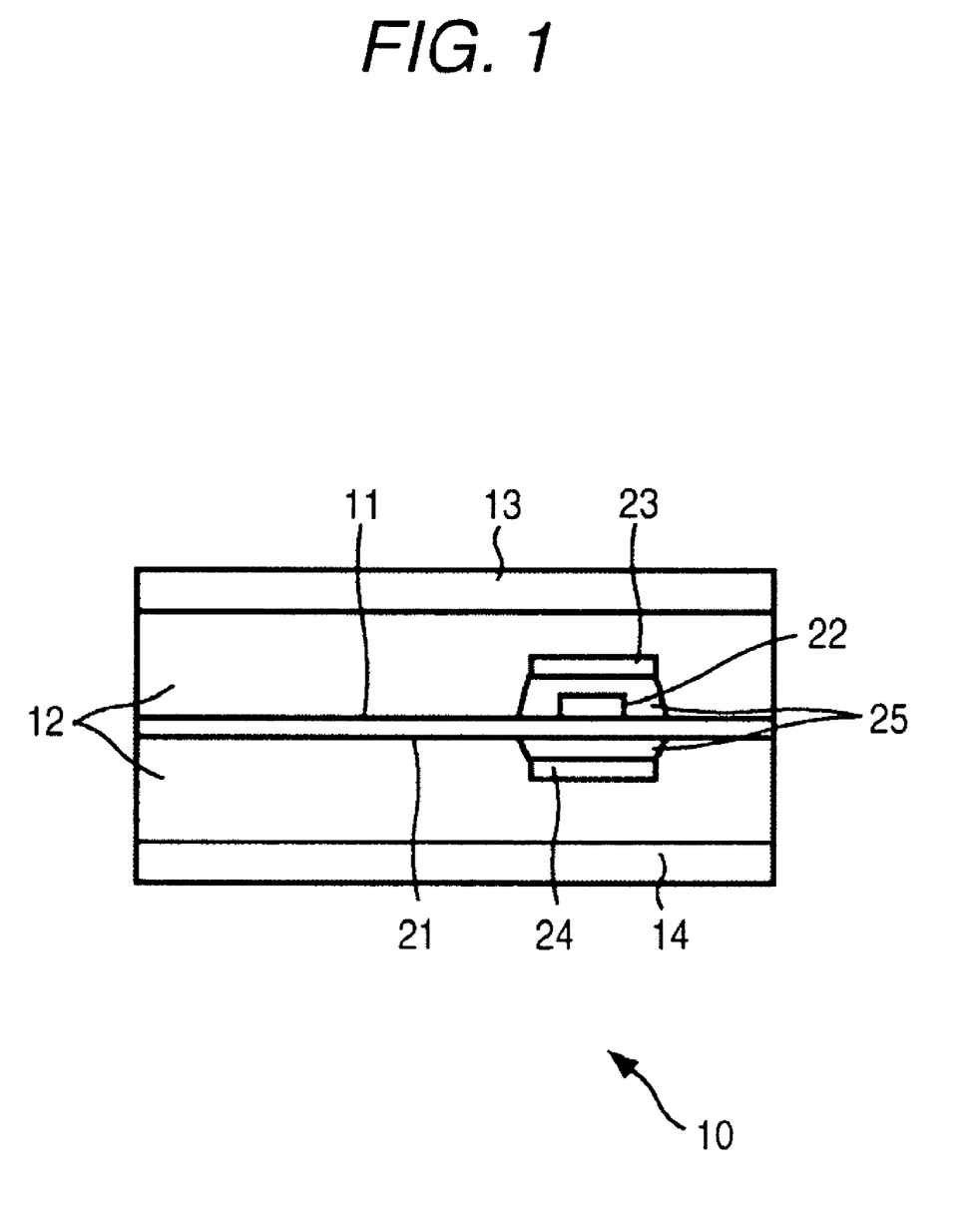
FIG. 1 shows a cross section schematically depicting a noncontact IC card to which an embodiment of the invention is adapted.

FIG. 1 shows a cross section schematically depicting a noncontact IC card 10 to which an embodiment of the invention is adapted.

The noncontact IC card 10 shown in FIG. 1 is configured in which a pair of cover sheet materials 13 and 14 is used to sandwich an antenna module 11 that communicates with external devices in a noncontact manner through an adhesive material layers 12.

The antenna module 11 is configured of an insulating substrate 21 and an IC chip 22 mounted on the insulating substrate 21. For the insulating substrate 21, a typical high polymer film is used. For typical high polymer films, there are resin films such as polyester, polyethylene terephthalate (PET), polyethylene naphtahalate (PEN), polyimide (PI), polyethylene, polypropylene, polyvinyl chloride, acrylic resins, polycarbonate, epoxy resins, urea resins, urethane resins, and melamine resins. A high polymer film used for the insulating substrate 21 is not restricted particularly as long as the film has insulating properties.

Moreover, hereinafter, as long as not particularly specified, the surface of the insulating substrate 21 on which the IC chip 22 is mounted is referred to as a mounting surface, and the surface opposite to the mounting surface is referred to as a surface on which the IC chip is not mounted.

Around the IC chip 22, a pair of metal reinforcing plates 23 and 24 such as stainless steel is provided that sandwiches the IC chip 22 from the mounting surface side and the surface side on which the IC chip is not mounted. The reinforcing plates 23 and 24 are bonded with a reinforcing plate adhesive 25.

For example, the reinforcing plates 23 and 24 are a stainless sheet, and the thickness thereof is decided depending on the strength of the IC chip 22 necessary for the noncontact IC card 10 and the layer configuration of the noncontact IC card 10. In addition, the shape and size of the reinforcing plates 23 and 24 are decided in accordance with the outer dimensions of the IC chip 22. Moreover, the reinforcing plates 23 and 24 are not necessarily a stainless sheet as long as materials can surely provide the strength of the IC chip 22 necessary for the noncontact IC card 10.

For example, the reinforcing plate adhesive 25 is a liquid adhesive. In addition, the form of the reinforcing plate adhesive 25 may be any forms as long as adhesives can bond the reinforcing plates 23 and 24 to the IC chip 22. For example, the reinforcing plate adhesive 25 may be a film adhesive sheet.

In addition, the form that the reinforcing plate adhesive 25 covers the side surface of the IC chip 22 is varied depending on the form of the reinforcing plate adhesive 25. The form may be any forms as long as forms can surely provide the strength necessary for the IC chip 22. Moreover, the bonding scheme of the reinforcing plate adhesive 25 is varied depending on the material of the reinforcing plate adhesive 25. For example, in the case in which the reinforcing plate adhesive 25 is an epoxy adhesive, thermosetting is desirable.

For example, the adhesive material layer 12 is formed of a two liquid epoxy adhesive. The two liquid epoxy adhesive is an adhesive that a compound (base resin) containing an epoxy group is mixed with a curing agent containing amines or acid anhydrides for bonding by curing reaction. For the compounds containing an epoxy group, bisphenol A, hydrogenated bisphenol A, novolac resins, bisphenol F, bromination epoxy resins, cyclic aliphatic epoxy resins, glycidylamine resins, and glycidylester resins are named.

In addition, for the curing agent containing amines or acid anhydrides, aliphatic primary and secondary amines (such as triethylenetetramine and dipropyltriamine), aliphatic tertiary amines (such as triethanolamine, and reaction products of aliphatic primary and secondary amines and epoxy), aliphatic polyamines (such as diethylenetriamine, tetraethylenepentamine, and bis(hexamethylene)triamine), aliphatic amines (such as metaphenylenediamine, diaminodiphenylmethane, and diaminodiphenylsulfone), amine adducts (such as reaction products of polyamine and an epoxy group), aromatic anhydrides (such as trimellitic anhydrid and pyromellitic anhydride), dicyandiamides and derivatives thereof, imidazoles, and thiols are named.

The cover sheet materials 13 and 14 are configured of a chemical element or a mixture of polyesters such as polyimide, polyester, polyethylene terephthalate and polyethylene naphtahalate, polyolefins such as propylene, celluloses such as cellulose triacetate and cellulose diacetate, acrylonitrile-butadiene-styrene resin, acrylonitrile-styrene resin, polystyrene, polyacrylonitrile, polyacrylic methyl, polymethyl-methacrylate, polyacrylic ethyl, and poly(ethylmethacrylate), and vinyl resins such as vinyl acetate and polyvinyl alcohol, and polycarbonates.

On the cover sheet materials 13 and 14, text and patterns may be printed by offset printing, screen printing, and gravure printing.

Figure 2:
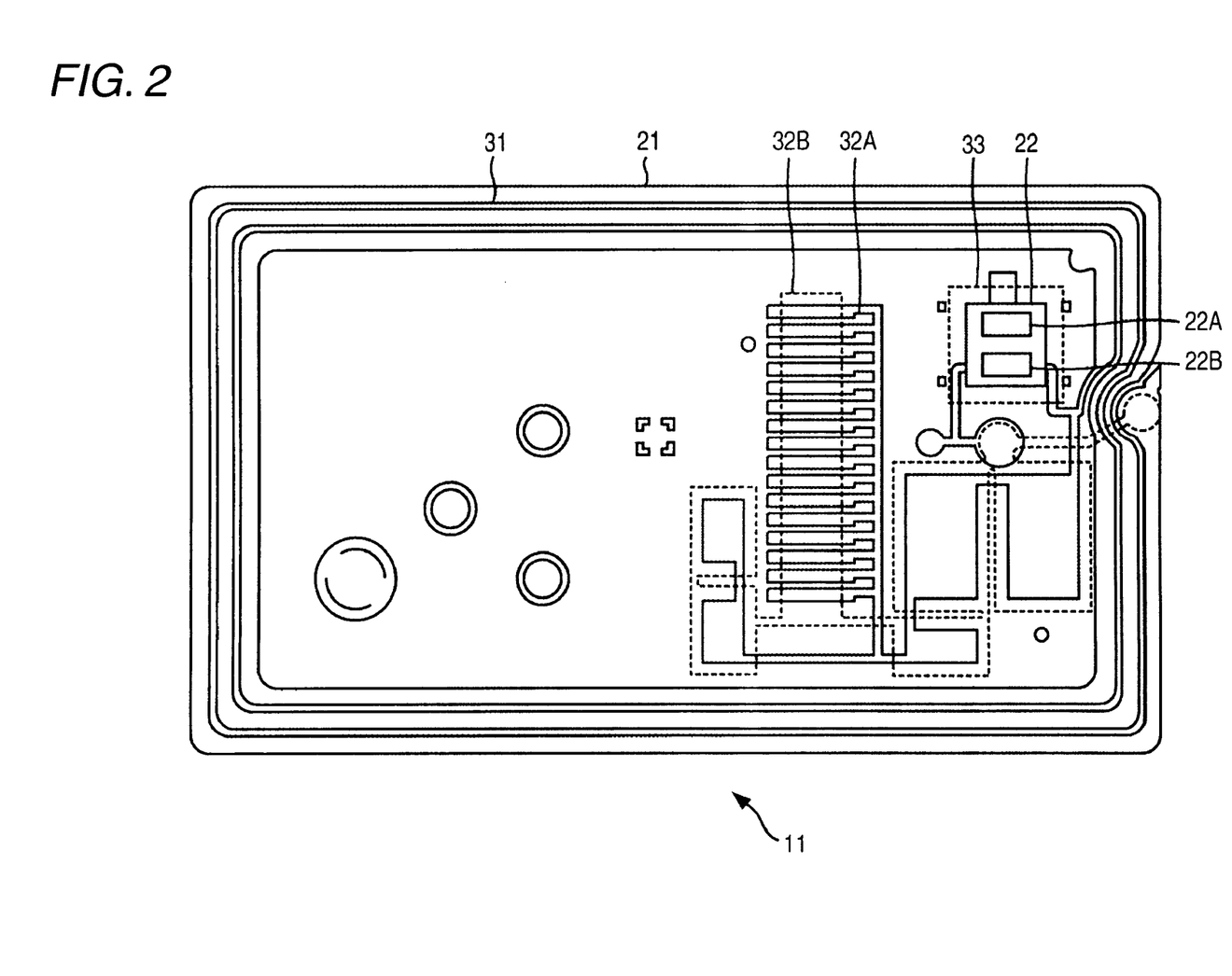
FIG. 2 shows a plan view depicting the antenna module shown in FIG. 1 seen from the mounting surface side.
Figure 3:
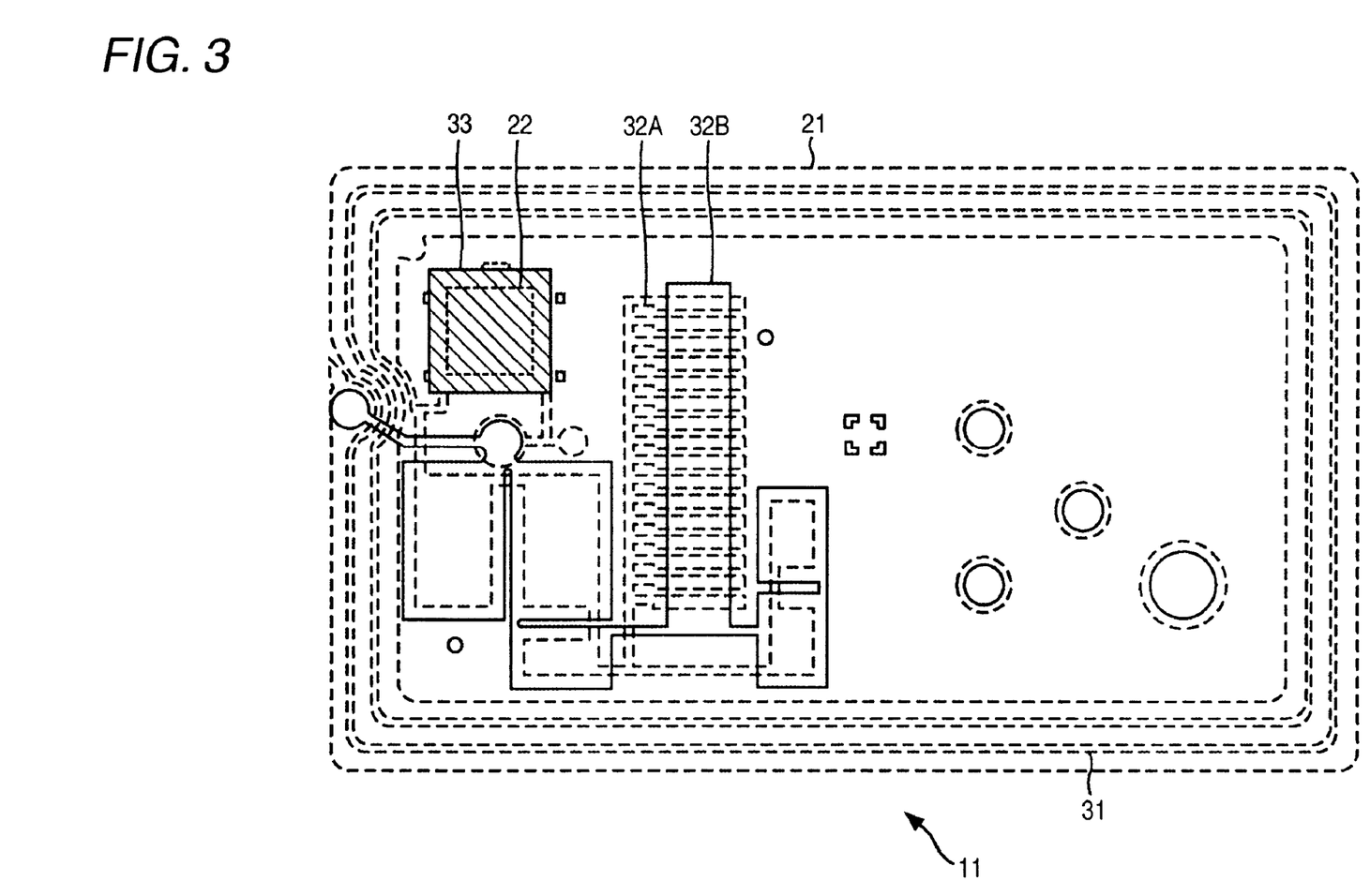
FIG. 3 shows a plan view depicting the antenna module shown in FIG. 1 seen from the surface on which the IC chip is not mounted.

FIG. 2 shows a plan view depicting the antenna module 11 shown in FIG. 1 seen from the mounting surface side, and FIG. 3 shows a plan view depicting the antenna module 11 from the surface side on which the IC chip is not mounted. In addition, in FIGS. 2 and 3, dotted lines depict elements on the opposite side through the insulating substrate 21.

As shown in FIG. 2, on the mounting surface of the insulating substrate 21, an antenna coil 31 formed of a metal foil is formed along the edge part of the insulating substrate 21, and the antenna coil 31 is connected to the IC chip 22 by mounting the IC chip 22 in flip chip packaging. In other words, projecting electrodes (bumps) formed on the circuit surface of the IC chip 22 are connected to the antenna coil 31 through an anisotropic conductive film or an anisotropic conductive paste adhesive. Moreover, for example, the IC chip 22 may be packaged by wire bonding with solder.

The antenna coil 31 communicates with external devices by using radio waves. The IC chip 22 has a temperature sensor 22A and a control circuit 22B incorporated therein. The temperature sensor 22A detects the temperature of the IC chip 22. The control circuit 22B controls communications done by the antenna coil 31. For example, in the case in which the temperature detected by the temperature sensor 22A is a temperature equal to or greater than a preset temperature (hereinafter, referred to as an abnormal temperature), the control circuit 22B terminates communications. The set temperature is the lowest temperature at which a degradation in properties and a reduction in reliability occur in the IC chip 22 due to semiconductor properties.

In addition, as shown in FIG. 2, on the mounting surface of the insulating substrate 21, a conductor 32A of a metal foil is formed, and as shown in FIG. 3, on the surface of the insulating substrate 21 on which the IC chip is not mounted, a conductor 32B of a metal foil is formed at the position corresponding to the conductor 32A. The conductor 32A and the conductor 32B form a condenser through the insulating substrate 21. By this condenser, the frequency of the antenna coil 31 can be set to 13.56 Hz, for example.

Furthermore, as shown in FIG. 3, on the surface of the insulating substrate 21 on which the IC chip is not mounted, a pattern 33 of a metal foil is formed in the space corresponding to the space on the mounting surface on which the IC chip 22 is mounted. Moreover, the space to form the pattern 33 on the surface on which the IC chip is not mounted is overlapped with the space on the mounting surface on which the IC chip 22 is mounted through the insulating substrate 21.

As described above, in the antenna module 11, since the pattern 33 of a metal foil with a high thermal conductivity is formed in a space on the surface on which the IC chip is not mounted, the space corresponding to the space on the mounting surface on which the IC chip 22 is mounted, heat dissipation in the IC chip 22 can be accelerated. Consequently, a degradation in properties and a reduction in reliability due to a temperature rise in the IC chip 22 can be prevented. In addition, the rate of occurrence of detecting abnormal temperatures by the temperature sensor 22A can be suppressed, and communications can be prevented from being terminated in the case in which the IC chip 22 is placed within the distance of allowing communications with the reader/writer.

Furthermore, in the antenna module 11, since the space in which the pattern 33 is formed is overlapped with the space on which the IC chip is mounted, heat dissipation can be effectively performed through the pattern 33.

In addition, it is sufficient that the space in which the pattern 33 is formed may be at least partially overlapped with the space on which the IC chip 22 is mounted, not overlapped with each other in the entire space.

The antenna coil 31, the conductors 32A and 32B, and the pattern 33 described above are formed in such a way that a conductive paste is printed on the insulating substrate 21, or that the insulating substrate 21 and a laminate base material of a metal foil such as an aluminum foil or a copper foil are etched in a circuit shape. Moreover, printing with a conductive paste or etching is performed on one surface one by one. Therefore, desirably, the thicknesses of the antenna coil 31 and the conductor 32A formed on the mounting surface are the same as the thicknesses of the conductor 32B and the pattern 33 formed on the surface on which the IC chip is not mounted. In addition, since the surface topology of the antenna coil 31 is reflected in the surface topology of the noncontact IC card 10, preferably, the surface is flat.

In addition, the IC chip 22 shown in FIG. 2 has the temperature sensor 22A incorporated therein, but it may not have the temperature sensor 22A incorporated therein. In this case, the control circuit 22B does not terminate communications depending on the abnormal temperature of the IC chip 22.

Next, with reference to FIGS. 4 to 13, the result of experiments will be described for determining the size and thickness of the pattern 33 preferable for the case in which the IC chip 22 has the temperature sensor 22A incorporated therein as shown in FIG. 2.

First of all, a method of fabricating a noncontact IC card 10 used in the experiments will be described.

In a first step, aluminum having a thickness of 30 µm is bonded to the mounting surface of an insulating substrate 21 formed of a PEN base material having a thickness of 50 µm, and aluminum having a thickness of the pattern 33, described later with reference to FIGS. 4 to 13, is bonded to the surface on which the IC chip is not mounted. In a second step, the insulating substrate 21 is etched that has been bonded to aluminum in the first step. Thus, the antenna coil 31 and the conductor 32A are formed on the mounting surface of the insulating substrate 21, and the conductor 32B and the pattern 33 are formed on the surface on which the IC chip is not mounted.

In a third step, an IC chip 22 having a thickness of 175 µm in 4 mm square, that is, having an area of 16 mm$^2$ is mounted on the mounting surface by flip chip packaging, whereby the IC chip 22 is connected to the antenna coil 31. In a fourth step, on the mounting surface side, the reinforcing plate 23 and the reinforcing plate adhesive 25 are used to encapsulate the IC chip 22, and on the surface side on which the IC chip is not mounted, the reinforcing plate 24 and the reinforcing plate adhesive 25 are used for encapsulation. As discussed above, at first, the antenna module 11 is formed.

After that, in a fifth step, the antenna module 11 is sandwiched between the cover sheet materials 13 and 14 having an expanded polyethylene terephthalate base material through an adhesive material layer 12 formed of an epoxy adhesive having a tensile shear adhesive strength of 4.5 N/mm$^2$. Thus, the noncontact IC card 10 for use in the experiments is formed.

Next, a method of the experiments will be described.

First, a tester places a noncontact IC card 10 fabricated as described above and a reader/writer that reads and writes information to the noncontact IC card 10 into a thermostatic oven at a temperature of 55° C., and they are allowed to stand for one hour. Subsequently, the tester places the noncontact IC card 10 at a distance from the reader/writer at which the temperature right above the IC chip 22 on the surface of the noncontact IC card 10 becomes the maximum, and starts communications between the noncontact IC card 10 and the reader/writer.

Then, the tester determines whether the temperature sensor 22A incorporated in the IC chip 22 detects an abnormal temperature within a communication time period, and the tester measures a time period for which the abnormal temperature is detected after communications are started, if detected. After 180 seconds from the beginning of communications, since the temperature of the IC chip 22 and the temperature right above the IC chip 22 on the surface of the noncontact IC card 10 are generally stable, a communication time period is set to 180 seconds. Moreover, for the reader/writer, SONY's strong electric field reader/writer is used.

Next, the result of the experiments will be described in which the size or the thickness of the pattern 33 to be formed on the noncontact IC card 10 is changed according to the method of the experiment as described above.

Figure 4:
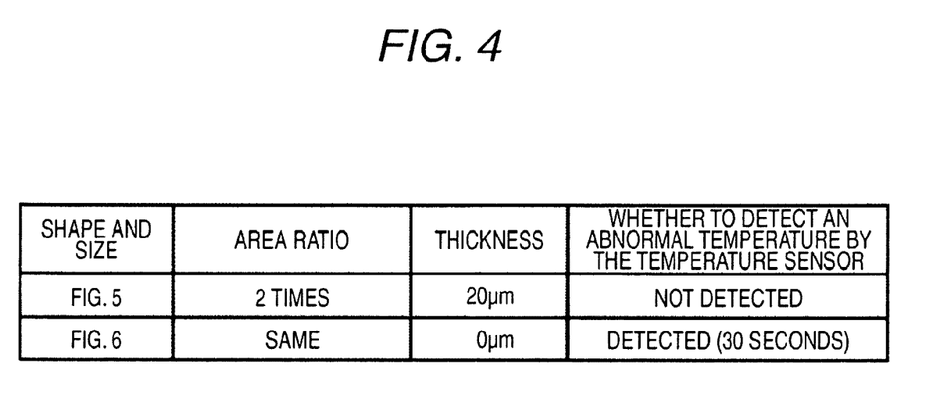
FIG. 4 shows a diagram depicting the results of experiments.
Figure 5:
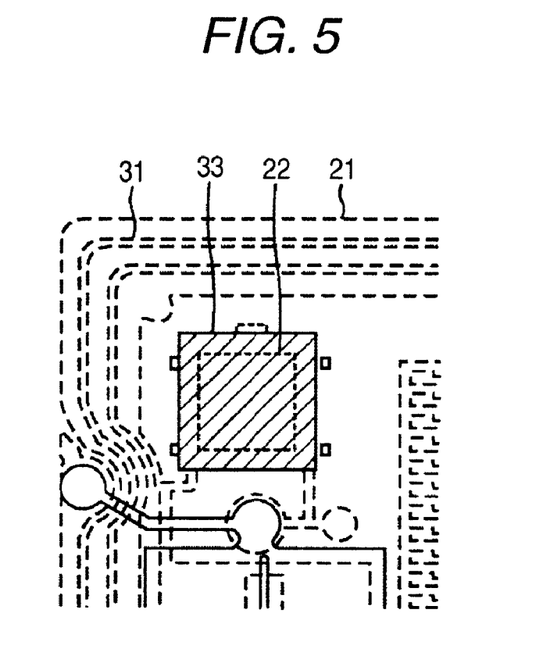
FIG. 5 shows a plan view depicting the pattern of a noncontact IC card used in the experiment.
Figure 6:
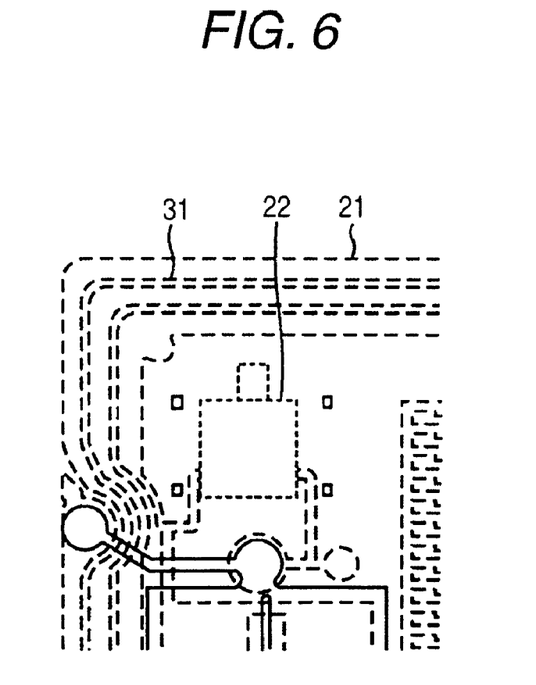
FIG. 6 shows a plan view depicting another pattern of a noncontact IC card used in the experiment.

FIG. 4 shows the result of the experiments in the case in which the pattern 33 in the shape and size shown in FIG. 5 is formed on the noncontact IC card 10, and in the case in which the pattern 33 is not formed as shown in FIG. 6.

Moreover, in FIGS. 5 and 6, only the space around the pattern 33 on the insulating substrate 21 is shown as seen from the surface side on which the IC chip is not mounted. This is similarly applied to the cases shown in FIGS. 9 to 13, described later.

On the first line in a table shown in FIG. 4, items "shape and size", "area ratio", "thickness", and "whether to detect an abnormal temperature by the temperature sensor" are described. On the second line, as the descriptions corresponding to each of the items, "FIG. 5", "two times", "20 µm", and "not detected" are described. On the third line, as the descriptions corresponding to each of the items, "FIG. 6", "zero time", "20 µm", and "detected (30 seconds)" are described.

In other words, the second line describes that as shown in FIG. 5, the shape of the pattern 33 is a square, the ratio of the area of the space on the surface on which the IC chip is not mounted and on which the pattern 33 is formed to the area of the space on the mounting surface on which the IC chip 22 is mounted (hereinafter, referred to as an area ratio) is two times, and the pattern 33 has a thickness of 20 µm. In this case, the temperature sensor 22A incorporated in the IC chip 22 does not detect any abnormal temperatures.

In addition, the third line describes that as shown in FIG. 6, the pattern 33 is not formed, in other words, the area ratio is zero time, and the pattern 33 has a thickness of 0 µm. In this case, the temperature sensor 22A detects an abnormal temperature after 30 seconds from the beginning of communications.

Therefore, from the result of the experiments shown in FIG. 4, it is revealed that heat is acceleratedly dissipated from the IC chip 22 through the pattern 33 formed on the surface of the insulating substrate 21 on which the IC chip is not mounted and the temperature sensor 22A does not detect any abnormal temperatures.

Figure 7:
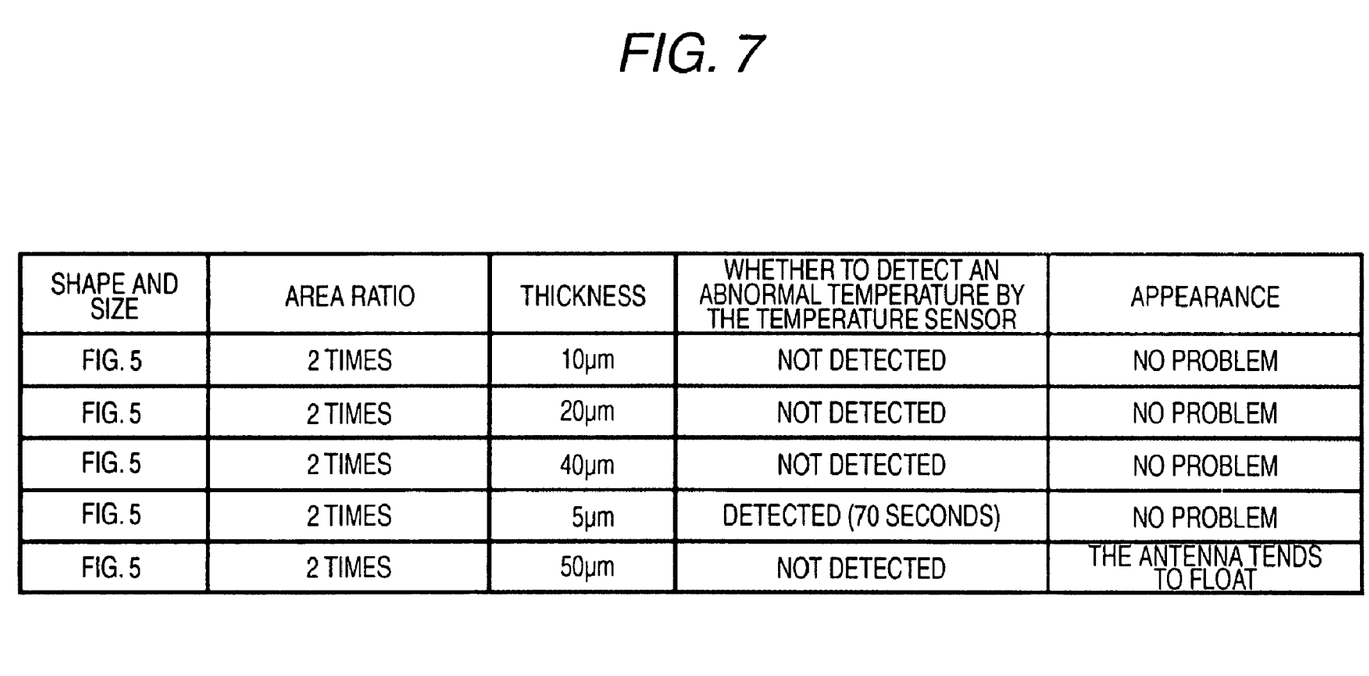
FIG. 7 shows a diagram depicting the other results of experiments.

Next, FIG. 7 shows the result of the experiments in the case in which the noncontact IC card 10 is formed with the pattern 33 in the shape and size shown in FIG. 5 having a thickness changed.

On the first line shown in FIG. 7, items "shape and size", "area ratio", "thickness", and "whether to detect an abnormal temperature by the temperature sensor", and "appearance" are described. On the second line, as the descriptions corresponding to each of the items, "FIG. 5", "two times", "10 µm", "not detected", and "no problem" are described. On the third line, as the descriptions corresponding to each of the items, "FIG. 5", "two times", "20 µm", "not detected", and "no problem" are described.

In addition, on the fourth line, as the descriptions corresponding to each of the items, "FIG. 5", "two times", "40 µm", "not detected", and "no problem" are described. On the fifth line, as the descriptions corresponding to each of the items, "FIG. 5", "two times", "5 µm", "detected (70 seconds)", and "no problem" are described. On the sixth line, as the descriptions corresponding to each of the items, "FIG. 5", "two times", "50 µm", "not detected", and "the antenna tends to float" are described.

In other words, the second line describes that as shown in FIG. 5, the shape of the pattern 33 is a square, the area ratio is two times, and the pattern 33 has a thickness of 10 µm. In this case, it is revealed that the temperature sensor 22A does not detect any abnormal temperatures and such a problem does not arise that the antenna module 11 looks floated in the appearance of the noncontact IC card 10. The third and the fourth lines describe that the shape and the area ratio are the same as those described in the second line and the pattern 33 having a thickness of 20 µm or the pattern 33 having a thickness of 40 µm is formed. In both cases, it is revealed that the temperature sensor 22A does not detect any abnormal temperatures and there is no problem in the appearance of the noncontact IC card 10.

In addition, the fifth line describes that the shape and the area ratio are the same as those described in the second line to the fourth line and the pattern 33 having a thickness of 5 µm is formed. In this case, it is revealed that after 70 seconds from the beginning of communications, the temperature sensor 22A detects an abnormal temperature but there is no problem in the appearance of the noncontact IC card 10. Furthermore, the sixth line describes that the shape and the area ratio are the same as those described in the second to the fifth lines and the pattern 33 having a thickness of 50 µm is formed. In this case, it is revealed that the temperature sensor 22A does not detect any abnormal temperatures but such a problem tends to arise that the antenna module 11 looks floated in the appearance of the noncontact IC card 10.

As discussed above, it is revealed that in the case in which the pattern 33 has a thickness of 10 µm to 40 µm inclusive, the temperature sensor 22A does not detect any abnormal temperatures and such a problem does not arise that the antenna module 11 looks floated in the appearance of the noncontact IC card 10. In addition, it is revealed that in the case in which the pattern 33 has a thickness of 5 µm, because the thickness of the pattern 33 is thin, the effect of heat dissipation is small, and the temperature sensor 22A detects an abnormal temperature.

Moreover, in the case in which the pattern 33 has a thickness of 5 µm, aluminum has a thickness of 5 µm that is bonded to the surface on which the IC chip is not mounted. Thus, the thickness of the conductor 32B is 5 µm that is formed on the surface on which the IC chip is not mounted. However, in the case in which aluminum has a thickness below 10 µm that is bonded to the surface on which the IC chip is not mounted, pin holes are generated in aluminum, which might cause an increase in the resistance value, fluctuations in the capacitance of the condenser formed in the conductor 32B, and a brake in lines in association with variations in the surface area. Therefore, also in the viewpoints of these, the thickness of 5 μm is an unfavorable thickness.

Furthermore, it is revealed unfavorable that in the case in which the pattern 33 has a thickness of 50 μm, the temperature sensor 22A does not detect any abnormal temperatures but the antenna module 11 looks floated in many noncontact IC cards 10.

Figure 8:
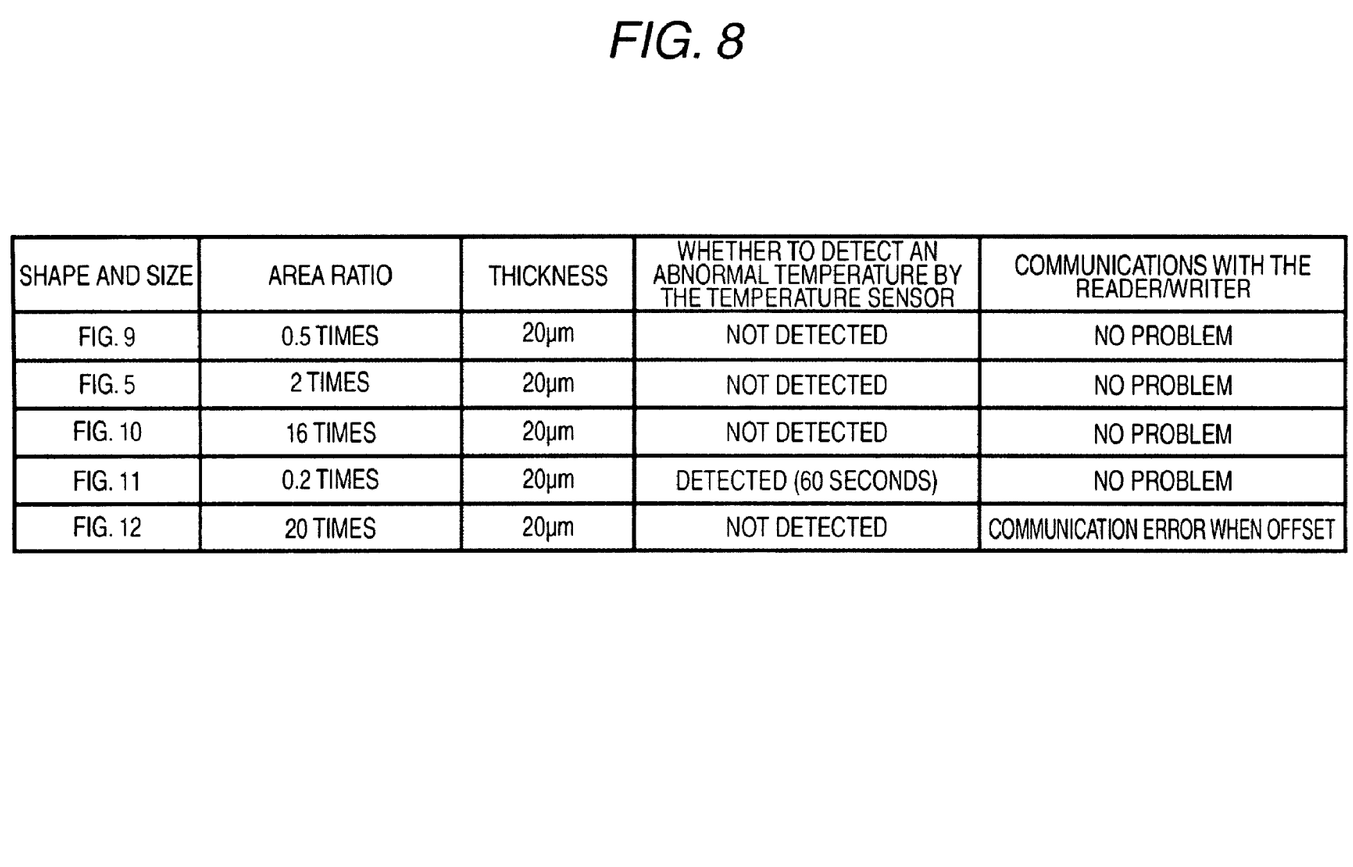
FIG. 8 shows a diagram depicting still other results of experiments.

Next, FIG. 8 shows the result of experiments in the case in which a pattern 33 is formed on the noncontact IC card 10 in the shape and size shown in FIGS. 9 to 13 having a thickness of 20 μm.

On the first line shown in FIG. 8, the items "shape and size", "area ratio", "thickness", "whether to detect an abnormal temperature by the temperature sensor", and "communications with the reader/writer" are described. On the second line, as the descriptions corresponding to each of the items, "FIG. 9", "0.5 times", "20 μm", "not detected", and "no problem" are described. On the third line, as the descriptions corresponding to each of the items, "FIG. 5", "two times", "20 μm", "not detected", and "no problem" are described.

Figure 10:
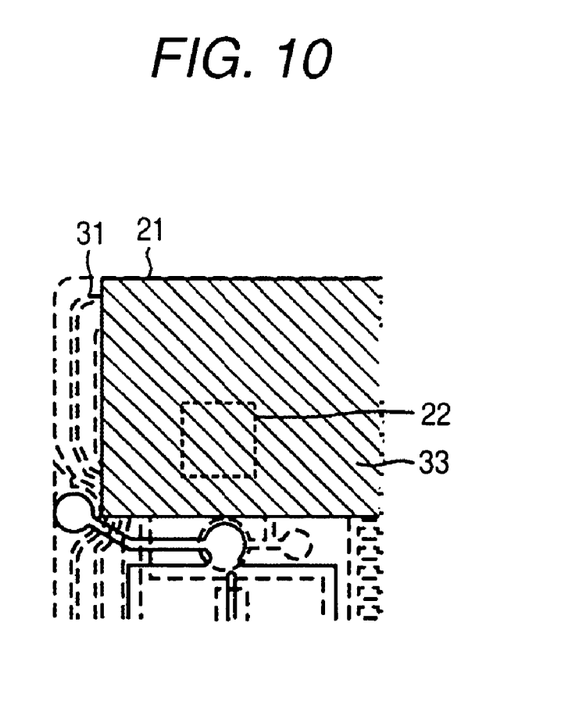
FIG. 10 shows a plan view depicting still another pattern of the noncontact IC card used in the experiment.

In addition, on the fourth line, as the descriptions corresponding to each of the items, "FIG. 10", "16 times", "20 μm", "not detected", and "no problem" are described. On the fifth line, as the descriptions corresponding to each of the items, "FIG. 11", "0.2 times", "20 μm", "detected (60 seconds)", and "no problem" are described. On the sixth line, as the descriptions corresponding to each of the items, "FIG. 12", "20 times", "20 μm", "not detected", and "communication error when offset" are described.

Figure 9:
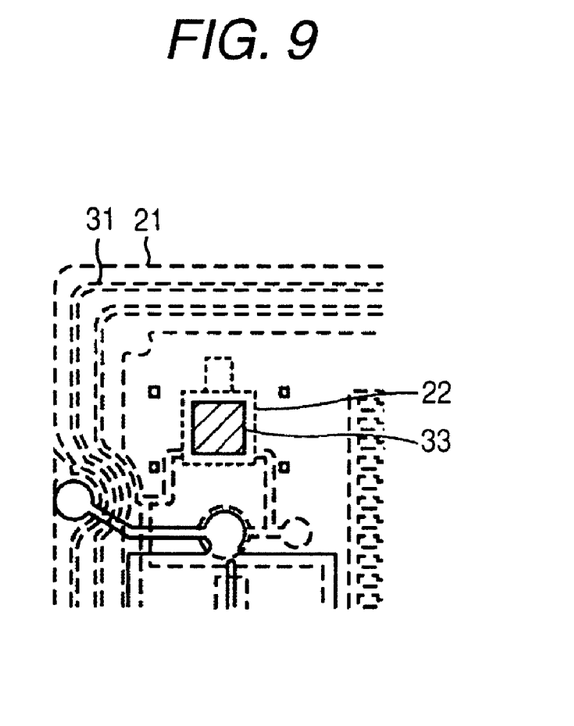
FIG. 9 shows a plan view depicting still another pattern of a noncontact IC card used in the experiment.

In other words, the second line describes that as shown in FIG. 9, the shape of the pattern 33 is a square, the area ratio is 0.5 times, and the pattern 33 has a thickness of 20 μm. In this case, it is revealed that the temperature sensor 22A does not detect any abnormal temperatures and there is no problem of communications between the noncontact IC card 10 and the reader/writer. The third and the fourth lines describe that the thickness is the same as that described in the second line but as shown in FIG. 5, a square pattern 33 having an area ratio of two times is formed, and as shown in FIG. 10, a rectangular pattern 33 having an area ratio of 16 times is formed. In both cases, it is revealed that the temperature sensor 22A does not detect any abnormal temperatures and there is no problem of communications between the noncontact IC card 10 and the reader/writer.

Figure 11:
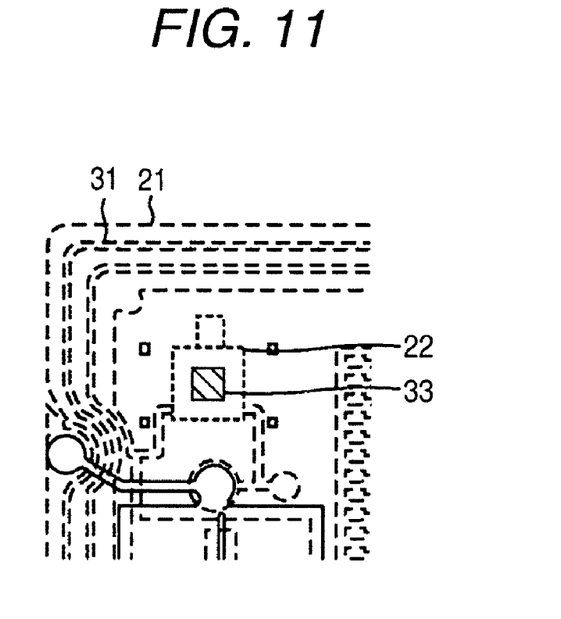
FIG. 11 shows a plan view depicting yet another pattern of the noncontact IC card used in the experiment.

In addition, the fifth line describes that the shape and thickness are the same as those described in the second line to the fourth line but as shown in FIG. 11, a square pattern 33 having an area ratio of 0.2 times is formed. In this case, it is revealed that after 60 seconds from the beginning of communications, the temperature sensor 22A detects an abnormal temperature but there is no problem of communications between the noncontact IC card 10 and the reader/writer.

Figure 12:
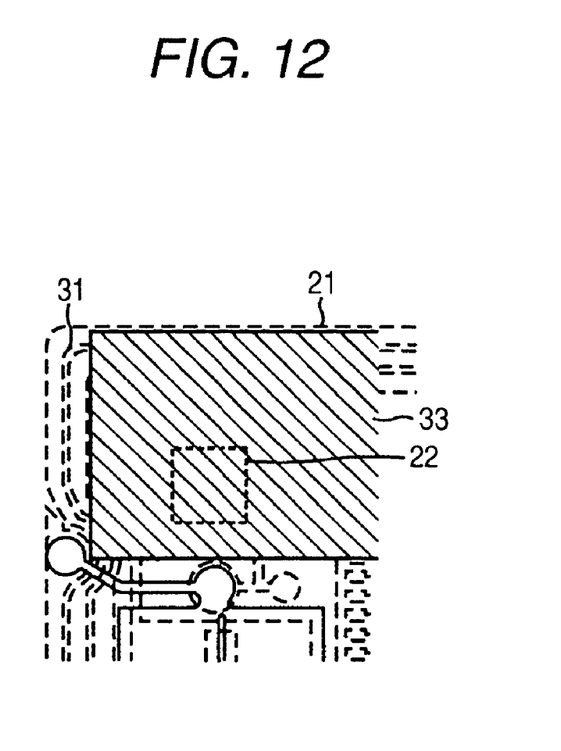
FIG. 12 shows a plan view depicting still yet another pattern of the noncontact IC card used in the experiment.

Furthermore, the sixth line describes that the thickness is the same as that described in the second to the fifth lines but as shown in FIG. 12, a rectangular pattern 33 having an area ratio of 20 times is formed. In this case, it is revealed that the temperature sensor 22A does not detect any abnormal temperatures but a problem arises that communication error occurs in communications between the noncontact IC card 10 and the reader/writer, in the case in which the position of the noncontact IC card 10 is shifted from the position corresponding to the reader/writer in the state in which the non-contact IC card 10 is in intimate contact with the reader/writer (hereinafter, it is referred to as the case in which the noncontact IC card 10 is offset).

As discussed above, it is revealed that in the case in which the area ratio of the pattern 33 is between 0.5 times and 16 times inclusive, the temperature sensor 22A does not detect any abnormal temperatures and there is no problem of communications with the reader/writer. In addition, it is revealed that in the case in which the area ratio of the pattern 33 is 0.2 times, the effect of heat dissipation is small and the temperature sensor 22A detects an abnormal temperature because the area of the pattern 33 is small. Furthermore, it is revealed that in the case in which the area ratio of the pattern 33 is 20 times, the temperature sensor 22A does not detect any abnormal temperatures but the space of aluminum bonded to the surface on which the IC chip is not mounted, that is, the space to block radio waves becomes large, which causes communication error in the case in which the noncontact IC card 10 is offset.

From the experiments shown in FIGS. 4 to 13, it is revealed that the area ratio of the pattern 33 formed in the noncontact IC card 10 is between 0.5 times and 16 times inclusive, and the thickness is between 10 μm and 40 μm inclusive, whereby the temperature sensor 22A can be prevented from detecting abnormal temperatures with no occurrence of problems of the appearance and communications. Then, the prevention of detecting abnormal temperatures suppresses the termination of communications in the case in which the IC chip 22 is placed within the distance of allowing communications with the reader/writer.

Therefore, the area ratio of the pattern 33 preferable to the case in which the IC chip 22 has the temperature sensor 22A incorporated therein is between 0.5 times and 16 times inclusive, and the thickness is between 10 μm and 40 μm inclusive.

Moreover, in the experiments described above, SONY's high electric field reader/writer is used, but in the case in which a reader/writer having higher electric field than SONY's one is used, the temperature sensor 22A may detect an abnormal temperature even though the pattern 33 having the preferable area and thickness is formed in the noncontact IC card 10.

However, even though a reader/writer having higher electric field than SONY's high electric field reader/writer is used, the time period of detecting an abnormal temperature from the beginning of communications tends to prolong more than the case in which the pattern 33 is not formed. Therefore, even though a reader/writer other than SONY's high electric field reader/writer is used, the pattern 33 is formed to suppress the rate of occurrence of detecting abnormal temperatures by the temperature sensor 22A, or to prolong the time period of detecting an abnormal temperature from the beginning of communications.

Moreover, the shape of the pattern 33 is not necessarily a square or a rectangle; it may be a cross, for example.

Furthermore, the embodiment of the invention is not restricted to the embodiment described above, which can be modified variously without deviating from the scope of teachings of the embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An antenna module in which an antenna coil formed of a metal foil and a condenser are formed on an insulating substrate, the antenna module comprising:

a control circuit configured to control communications done by the antenna coil, the control circuit disposed on the insulating substrate; and a pattern formed of a metal foil for dissipating heat, the metal foil having a thickness between about 10 micrometers and about 40 micrometers, wherein the pattern is formed on the insulating substrate on the opposite side of the control circuit through the insulating substrate, and the control circuit has
- a detecting means for detecting a temperature of the control circuit, and
- a control means for terminating the communications when a temperature of the control circuit is equal to or above a predetermined temperature.

2. The antenna module according to claim 1, wherein a space on the insulating substrate on which the control circuit is disposed and a space on the insulating substrate on which the pattern is formed are at least partially overlapped with each other through the insulating substrate.

3. The antenna module according to claim 1, wherein an area of a space on the insulating substrate on which the pattern is formed is between 0.5 times and 16 times, inclusive, an area of a space on the insulating substrate on which the control circuit is disposed.

4. An antenna module in which an antenna coil formed of a metal foil and a condenser are formed on an insulating substrate, the antenna module comprising:

a control circuit configured to control communications done by the antenna coil, the control circuit disposed on the insulating substrate; and a pattern formed of a metal foil for dissipating heat, the metal foil having a thickness between about 10 micrometers and about 40 micrometers, wherein the pattern is formed on the insulating substrate on the opposite side of the control circuit through the insulating substrate, and the control circuit has
- a detecting unit configured to detect a temperature of the control circuit, and
- a control unit configured to terminate the communications when a temperature of the control circuit is equal to or above a predetermined temperature.

5. The antenna module according to claim 4, wherein a space on the insulating substrate on which the control circuit is disposed and a space on the insulating substrate on which the pattern is formed are at least partially overlapped with each other through the insulating substrate.

6. The antenna module according to claim 4, wherein an area of a space on the insulating substrate on which the pattern is formed is between 0.5 times and 16 times, inclusive, an area of a space on the insulating substrate on which the control circuit is disposed.

* * * * *